US 12,052,276 B2

(12) United States Patent
Burns et al.

(10) Patent No.: US 12,052,276 B2
(45) Date of Patent: Jul. 30, 2024

(54) PEOPLE-CENTRIC THREAT SCORING

(71) Applicant: PROOFPOINT, INC., Sunnyvale, CA (US)

(72) Inventors: Bryan Robert Burns, Portland, OR (US); David Robert Knight, Los Altos, CA (US); Christopher Anthony Iezzoni, Santa Cruz, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 633 days.

(21) Appl. No.: 16/278,016

(22) Filed: Feb. 15, 2019

(65) Prior Publication Data
US 2020/0177614 A1 Jun. 4, 2020

Related U.S. Application Data

(60) Provisional application No. 62/774,055, filed on Nov. 30, 2018.

(51) Int. Cl.
*H04L 29/06* (2006.01)
*H04L 9/40* (2022.01)

(52) U.S. Cl.
CPC ........ *H04L 63/1433* (2013.01); *H04L 63/102* (2013.01); *H04L 63/105* (2013.01)

(58) Field of Classification Search
CPC .. H04L 63/1433; H04L 63/102; H04L 63/105
See application file for complete search history.

(56) References Cited

U.S. PATENT DOCUMENTS

| | | | | |
|---|---|---|---|---|
| 7,552,480 | B1 * | 6/2009 | Voss .................... | G06F 21/577 |
| | | | | 713/150 |
| 9,426,169 | B2 * | 8/2016 | Zandani ............. | H04L 63/1433 |
| 9,661,003 | B2 * | 5/2017 | Parker ................ | H04L 63/1408 |
| 9,749,343 | B2 * | 8/2017 | Watters .............. | H04L 63/1433 |
| 10,063,582 | B1 * | 8/2018 | Feng .................. | G06F 21/575 |
| 10,084,809 | B1 * | 9/2018 | Rambo ................ | G06F 21/577 |
| 10,104,109 | B2 * | 10/2018 | Singla ................. | G06F 21/577 |
| 10,289,838 | B2 * | 5/2019 | Singla ................. | H04L 63/1433 |

(Continued)

OTHER PUBLICATIONS

Doynikova et al., "Enhancement of Probabilistic Attack Graphs for Accurate Cyber Security Monitoring", 2017, IEEE, pp. 1-6 (Year: 2017).*

(Continued)

*Primary Examiner* — Mahfuzur Rahman
*Assistant Examiner* — Alex D Carrasquillo
(74) *Attorney, Agent, or Firm* — Banner & Witcoff, Ltd.

(57) ABSTRACT

The subject disclosure relates to methods for assessing cyber-security risks, and in particular for calculating a risk-index for multiple users of a computer network. In some implementations, a process of the disclosed technology includes steps for determining a privileged index for each of a plurality of network users, determining a vulnerability index for each of the plurality of network users, calculating a threat score for one or more cyber-security attacks directed at each of the plurality of network users, and calculating a risk-index for at least one network user from among the plurality of network users, wherein the risk-index is based on the privileged index, the vulnerability index, and the threat score associated with each of the network users. Systems and machine-readable media are also provided.

19 Claims, 5 Drawing Sheets

(56) References Cited

U.S. PATENT DOCUMENTS

| | | | |
|---|---|---|---|
| 10,375,104 B1* | 8/2019 | Wu | H04L 63/1416 |
| 10,754,958 B1* | 8/2020 | Sidagni | G06F 21/577 |
| 2005/0278786 A1* | 12/2005 | Tippett | H04L 63/1416 |
| | | | 726/25 |
| 2007/0169194 A1* | 7/2007 | Church | H04L 63/1416 |
| | | | 726/23 |
| 2011/0184877 A1* | 7/2011 | McHugh | G06Q 10/10 |
| | | | 705/318 |
| 2012/0203590 A1* | 8/2012 | Deb | G06Q 10/0635 |
| | | | 705/7.28 |
| 2012/0215575 A1* | 8/2012 | Deb | G06Q 10/0635 |
| | | | 705/500 |
| 2013/0111592 A1* | 5/2013 | Zhu | G06F 21/577 |
| | | | 726/25 |
| 2013/0191919 A1* | 7/2013 | Basavapatna | H04L 63/20 |
| | | | 726/25 |
| 2013/0239177 A1* | 9/2013 | Sigurdson | H04L 63/1433 |
| | | | 726/4 |
| 2015/0229664 A1* | 8/2015 | Hawthorn | H04L 63/1433 |
| | | | 726/25 |
| 2015/0237065 A1* | 8/2015 | Roytman | H04L 63/1433 |
| | | | 726/25 |
| 2015/0347750 A1* | 12/2015 | Lietz | G06F 21/552 |
| | | | 726/23 |
| 2015/0381649 A1* | 12/2015 | Schultz | G06Q 10/0635 |
| | | | 726/25 |
| 2016/0306965 A1* | 10/2016 | Iyer | G06Q 10/105 |
| 2016/0379326 A1* | 12/2016 | Chan-Gove | H04L 63/1433 |
| | | | 705/325 |
| 2017/0104790 A1* | 4/2017 | Meyers | H04L 63/1433 |
| 2017/0244746 A1* | 8/2017 | Hawthorn | G06F 21/55 |
| 2017/0331840 A1* | 11/2017 | Ranjan | H04L 63/1441 |
| 2017/0331849 A1* | 11/2017 | Yu | H04L 63/10 |
| 2018/0004948 A1* | 1/2018 | Martin | G06F 21/552 |
| 2018/0005315 A1* | 1/2018 | Rines | H04L 63/1425 |
| 2018/0052994 A1* | 2/2018 | Iyer | G06F 21/552 |
| 2018/0083988 A1* | 3/2018 | Kataoka | H04L 63/1416 |
| 2018/0124091 A1* | 5/2018 | Sweeney | G06F 16/2228 |
| 2018/0146004 A1* | 5/2018 | Belfiore, Jr. | G06F 21/577 |
| 2018/0150639 A1* | 5/2018 | Abramovsky | G06F 21/577 |
| 2018/0234435 A1* | 8/2018 | Cohen | H04L 63/1416 |
| 2019/0253447 A1* | 8/2019 | Sweeney | H04L 63/14 |
| 2019/0311132 A1* | 10/2019 | Arnoth | G06F 21/53 |

OTHER PUBLICATIONS

Dec. 9, 2019 (WO) International Search Report and Written Opinion—App. PCT/US2019/051281.
Aug. 2, 2023—(IL) Office Action—App No. 283541.

* cited by examiner

PEOPLE-CENTRIC THREAT SCORING

CROSS-REFERENCE TO RELATED APPLICATIONS

This application claims the benefit of U.S. Application No. 62/774,055, filed Nov. 30, 2018, entitled "PEOPLE-CENTRIC THREAT SCORING", which is incorporated by reference in its entirety.

BACKGROUND

1. Technical Field

This disclosure generally relates to the field of computer security, and more specifically to systems and methods for performing threat detection and risk-index scoring.

2. Introduction

Organizations are frequently challenged by cyber-security attacks that involve fraud, data destruction, intellectual property theft, and that have national security implications. Some attackers are highly sophisticated and backed by nation states or groups with political agendas. Rapid detection of security threats is critical for organizations to prevent compromise of their networks, computer systems, applications, and data.

Although cyber-security systems can be adapted to identify and report attacks, the sheer volume of intrusion attempts can make it difficult to identify specific attempts that are particularly interesting or of relatively high concern. One conventional method for triaging large volumes of attack attempts is to provide heightened security for high-risk individuals, such as those at elevated positions in the organizational hierarchy, or with access to sensitive information. One shortcoming of these conventional methods is that attack attempts are often unpredictable, and target low-profile users.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
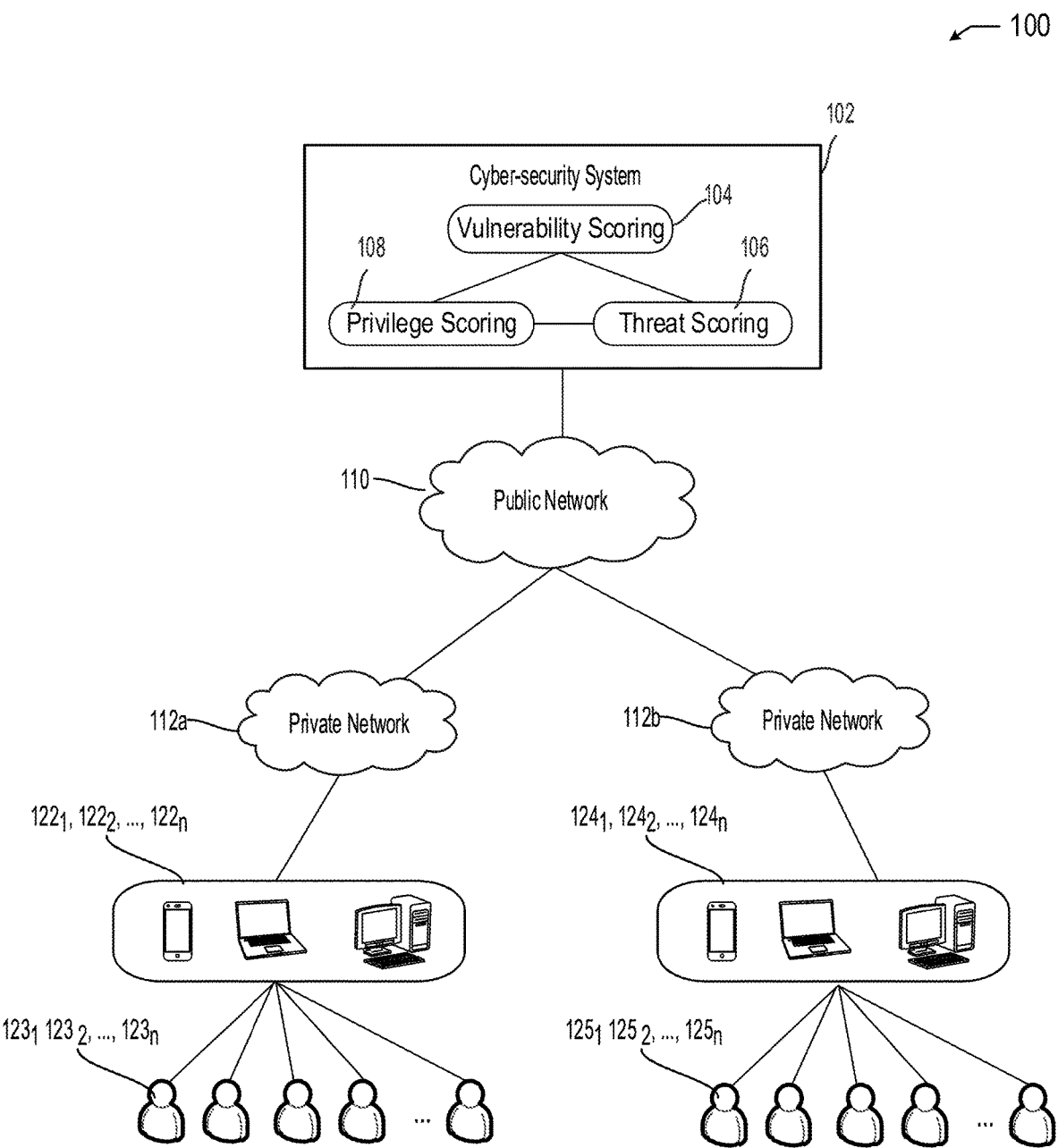
FIG. 1 illustrates an example environment in which a cyber-security system of the disclosed technology can be implemented.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Aspects of the disclosed technology address the foregoing limitations of conventional threat detection technologies by providing systems and methods for performing risk-index scoring that can be used to rank intrusion attempts. In this way, interesting or especially high-risk attacks can be identified and selected for further action.

Overview:

Threat scoring can be applied in a people-centric manner. For example, threat scores associated with attacks targeting a particular user in an organization can be used to compute an attack index for that person, representing a composite for all threats targeting that individual. In some instances, the attack index can be used in conjunction with other attributes, such as a privilege index and/or vulnerability index, and used to determine a risk-index on an individual by individual basis (e.g., a people risk-index). Once risk-index values have been established, relativistic risk profiles can be evaluated for various hierarchal levels of an organization, or based on different network domains, etc. By way of example, risk profiling can be performed on the basis of geography, business unit, network domain, and/or organization type, etc.

By providing the ability to evaluate individual risk based on a people-centric attack index, the disclosed invention can provide valuable insights as to what inbound threats should be selected for further response, for example, by an organization's security provider or network security team. Such insights can be used to manage organizational exposure by providing targeted insights on what network users, user groups, domains, or business units could benefit from enhanced training and/or security infrastructure.

As used herein, a "threat score" can relate to a numerical score for a specific threat detected by a cyber-security system. A threat score can be based on data identifying the type of threat (e.g. threat type) and actor. As used herein, threat type can relate to any categorical identifier that is (or can be) used to describe a particular mode of cyber-attack. By way of example, various threat types can include, but are not limited to, one or more of the following categories: APT Malware State, APT Malware Financial, Backdoor, Sysadmin Tools, Pen-Test, RAT, Keylogger, Point-of-Sale, Stealer, Malware Unknown, Downloader, Credential Phish Unknown, Credential Phish Corporate, Ransomware, Credential Phish Consumer, Banker, Spambots, Cryptocurrency Miners, Ad-Fraud, MalSpam, and the like.

As discussed in further detail below, different types of functions can be used to calculate an aggregate threat score, e.g., on a per-user basis. For example, threat scores may be derived from sum totals of threats for each of a number of users. In other implementations, threat scores can be calculated using an exponential loss function to aggregate the threat scores on a per-user basis. It is understood that various threat score calculations can be used, depending on the desired implementation.

Additionally, as used herein "actor" can refer to any information that indicates, or that can be used to infer an identity of an individual, group or organization (e.g., crime syndicate or nation state, etc.) responsible for launching a cyber-attack or attack campaign. In some instances, information known about the threat type can be used to infer actor information, and vice versa.

Threat scoring can be further based on quantitative or qualitative measures of "targetedness." As used herein, targetedness can refer to a measure of attack specificity, and can be based on the breadth (or narrowness) of an attack or attack campaign within a specific context. By way of example, an attack can be highly targeted (of "high targetedness") if it is directed at a single individual, or group of similar individuals, such as, all engineering directors, or all Human Resources (HR) heads, etc., within an organization. Additionally, an attack may have greater targetedness if directed at organizations or networks associated with a specific market vertical, e.g., specifically targeting data security companies, specific political affiliates, or healthcare providers, etc. As such, the degree of targetedness assigned to an attack can depend on the scope and context in which the attack occurs.

In some approaches, targetedness can also be based on geographic specificity. For example, if an attack is propagated across diverse geographic areas, it may be deemed to have a lower targetedness than if the attack was directed at specific geographic (or socio-political) areas. By way of example, if an attack is targeted at unrelated businesses across North America, then the attack may be given a relatively low targetedness score. Alternatively, if the attack is limited to technology companies in San Jose and Boston, the attack may be deemed to have greater targetedness, reflecting a greater contextual specificity.

The threat scoring model provides a numerical score that acts as a severity index for a specific threat. In some implementations, scores are fixed on a scale from 1-1000; however, it is understood that other scaling ranges may be implemented, without departing from the scope of the technology. In some implementations, an initial range can be calculated based on threat and actor type, and wherein the final score within the initial range is based on the determined amount of targetedness (concentration) of the threat. For example, if the threat is widespread (less targeted), then the final threat score may be at the lower end of the initial range. However, if the threat is highly-targeted (high targetedness), then the final threat score may be at the upper boundary of the initial range.

As an example, a range of possible scores determined from the threat+actor combination may be: Ransomware+Russian Crime Organization=(20 min, 100 max)—that is, the range would be 20-100. If targetedness is determined to be low (i.e., multiple unrelated users received the same attack attempt), the final threat score may be closer to 20 than 100. Alternatively, if targetedness is determined to be high (i.e., a small group of highly similar users received the attack at the exclusion of all others), then the final threat score may be closer to 100 than 20.

As used herein, "privilege index" or "privilege score" can refer to a numerical score (e.g., a composite score) representing a degree or amount of privileged associated with a particular network user. By way of example, a privileged index can be based on one or more of: a degree of elevation of login credentials, a degree of access to specific data or system resources, access to intellectual property, access to employee or customer data, an ability to wire-transfer funds, and/or access to insider information, etc.

As used herein, "vulnerability index" or "vulnerability score" can refer to a numerical score (e.g., a composite score) representing user vulnerable to various threat vectors. A vulnerability index can be based on a user's systems and job roll, as well as user behaviors including previous actions that can increase (or decrease) the user's likelihood of falling victim to an attack. By way of example, the vulnerability index can be based a degree of vulnerability due to a job roll that requires frequent user interaction with threat vectors, e.g., urls, email attachments, and/or phishing messages. The vulnerability index can also be based on a user's implementation (or lack thereof) of enhanced security controls, such as when it is detected that the user is utilizing multi-factor authentication, or cloud sandboxing for email attachments, etc. Additionally, the vulnerability index may be based on user vulnerabilities due to use of older or vulnerable software, operating systems, or devices, and/or vulnerability measures based on user behaviors, such as performance on security audits and/or security training tests, etc.

In some implementations, the computed attack-index, privilege index, and vulnerability-index, can be used to determine overall risk-index for each individual (user) within an organization. That is, risk-index scoring can be performed on a user-by-user basis. In one approach, the risk-index may be computed from a sum of individual scores calculated for each of the attack-index, privileged index and vulnerability-index. However, other risk-index score calculations may be used, without departing from the scope of the technology. For example, risk-index scores can be based on an exponential loss function to aggregate the threat scores on a per-user basis, rather than using a simple sum of scores. However, other scoring methodologies are contemplated without departing from the scope of the disclosed technology.

FIG. 1 illustrates an example environment 100 in which a cyber-security system of the disclosed technology can be implemented. Environment 100 includes cyber-security system 102 that is communicatively coupled to private networks 112 (112a, 112b) via public network 110. It is understood that public network 110 can include one or more private networks, such as, one or more Wide Area Networks (WANs), Local Area Networks (LANs), and/or a network of networks, such as the Internet. Additionally, private networks 112 can represent a combination of WANs and/or LANs, for example, which implement a private (internal) network (e.g., an Intranet) for a corporation, government organization, political entity, or the like.

Private networks 112a, 112b are each associated with a variety of client devices that are configured to access to their respective private network to a variety of network users, and to provide outside connectivity, such as to public network 110 (i.e. the Internet). Specifically, private network 112a is configured to be accessed by users 123, using one or more of devices 122. Private network 112b is configured to be accessed by users 125, using one or more of devices 124. It is understood that a greater (or fewer) number of private networks, users, and/or devices can be implemented, without departing from the disclosed technology.

In practice, cyber-security system 102 is configured to perform operations for monitoring private networks 112, and facilitating their protection from various cyber-security threats. In some implementations, cyber-security system 102 is configured to receive information regarding network users (123, 125), and devices (122, 124) of private networks 112, for the purpose of determining a privilege index, and/or a vulnerability index associated with each of the users (123, 125). Additionally, cyber-security system 102 is configured to monitor private networks 112 and to identify cyber-security attacks, including but not limited to, information pertaining to threat type, targetedness, and threat actors, etc. Such information can be used to compute a threat score pertaining to one or more cyber-security attacks against a network (e.g. one of private networks 112), a network subdomain, a group of users, or a specific user, etc. As discussed in further detail below, threat score information, privilege index information, and/or vulnerability index information can be used to compute a risk-index that provides a relativistic measure of severity associated a given cyber-attack.

Importantly, the risk-index can be a user-centric score, for example, that quantifies a relative degree of security risk associated with a particular user. In other implementations, risk-index computations can be used to characterize risk for other granularities/levels of organizational and/or network hierarchy. For example, risk indices can be computed for one or more: groups of network users, business units, network domains, network subdomains, user credential segments, geographic regions, organizations, industries, and/or market verticals, etc.

Risk-index computations can be carried out, or facilitated by cyber-security system 102, which includes various modules for computing vulnerability index, privilege index, threat-index, and/or risk-index scores. As illustrated in the example provided by environment 100, cyber-security system 102 includes vulnerability scoring module 104, threat scoring module 106, and privilege scoring module 108. Various scoring modules 104, 106, 108 can include hardware (e.g., processors, memory, and network interfaces), and/or software/firmware necessary to perform vulnerability index scoring, privilege index scoring, threat scoring and/or risk-index scoring, as discussed in further detail below, with respect to FIG. 2.

Figure 2:
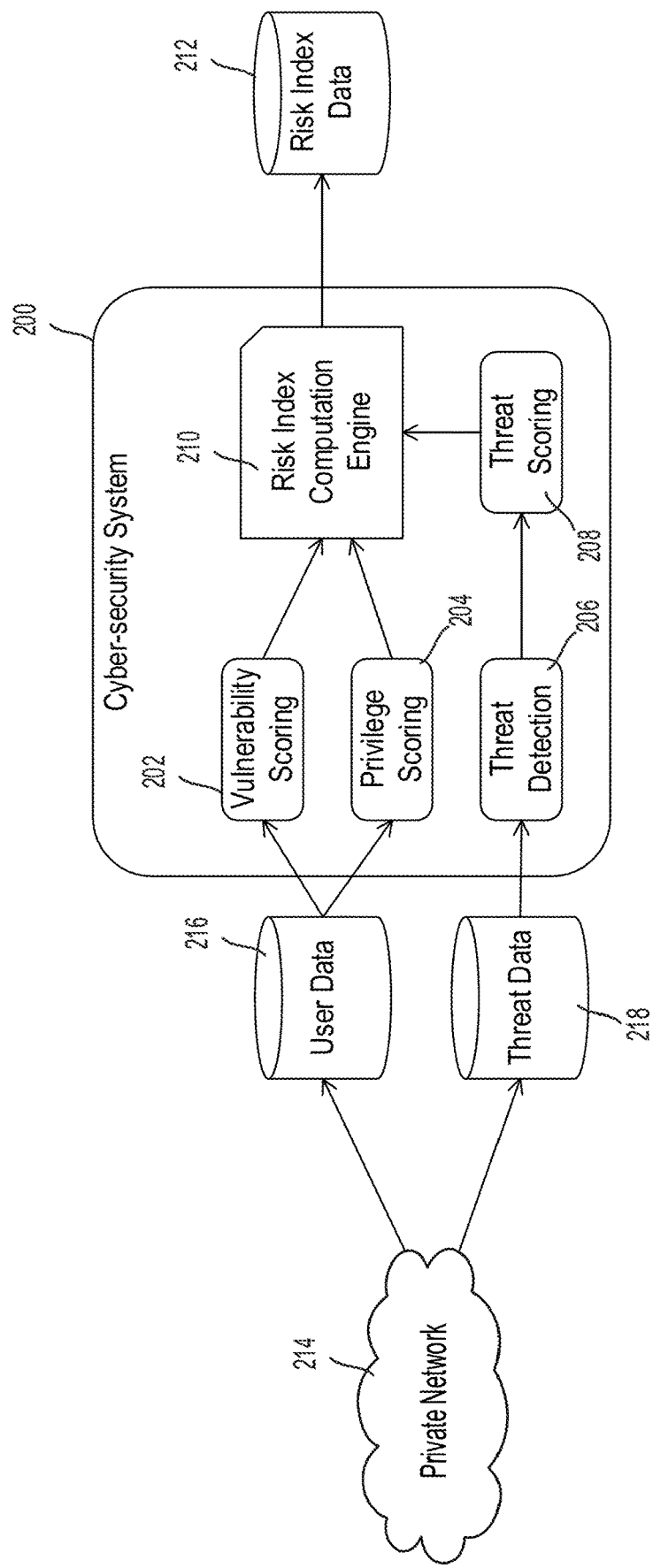
FIG. 2 illustrates a schematic diagram of various components that can be used to implement a cyber-security system according to some aspects of the technology.

FIG. 2 illustrates a schematic diagram of various components that can be used to implement a cyber-security system 200, according to some aspects. Similar to cyber-security system 102 discussed with respect to FIG. 1, cyber-security system 200 includes vulnerability scoring module 202, privilege scoring module 204, threat detection module 206, threat scoring module 208, and risk computation engine 210.

Vulnerability scoring module 202, privilege scoring module 204, threat detection module 206, and threat scoring module 208 are variously configured to provide information to risk computation engine 210. In turn risk competition engine 210 computes risk indices that are outputted to risk-index database 212. As discussed in further detail below, risk-index calculations can be provided to one or more cyber-security clients, such as those affiliated with private network 214, and used to assess relative degrees of cyber-security risk amongst, users, business units, subdomains, or other divisions, etc.

In practice, user data 216 and threat data 218 are received by cyber-security system 200 from private network 214. User data can include any information relating to users of private network 214, including but not limited to: user demographic information, credential information, credential elevation history, user device information, software version information, etc. Additionally, in some aspects, user data 216 can include user behavioral data, including but not limited to information indicating a user's performance on security audits, a user's implementation of security safeguards such as two-factor authentication, and/or information indicating resources at the disposal of the user, e.g., access to intellectual property, access to sensitive data, and/or an ability to transfer economic resources, etc.

Threat data 218 can include any information related to one or more cyber-attacks perpetrated against private network 214, including any user devices and/or users associated with private network 214. Depending on the desired implementation, user data 216 and/or threat data 218 can be provided to cyber-security system 200 from private network 2147, or may be automatically scraped or collected by cyber-security system 200, for example, as part of a security monitoring deployment.

User data 216 from private network 214 is provided to vulnerability scoring module 202, and privilege scoring module 204. Vulnerability scoring module 202 is configured receive user data 216, and to compute a corresponding vulnerability index for each of a multitude of network users of private network 214, based on user data 216. By way of example, the vulnerability index can be based on a user's network devices and/or software systems, wherein outdated or at-risk systems can increase the calculated vulnerability index. The vulnerability index can also be based on user data 216 that relates to the user's job roll, as well as behaviors including previous actions that may increase (or decrease) the user's likelihood of falling victim to a cyber-attack. For example, user data indicating that a user frequently interacts with threat vectors, e.g., urls, email attachments, and/or phishing messages, etc., can cause the vulnerability index to increase. Conversely, user data indicating a user's history of successfully avoiding threat attempts (e.g., phishing email links, etc.) may cause the user's associated vulnerability index to decrease.

Privilege scoring module 204 is configured to receive user data 216, and to compute a privilege index. The privilege index can be a numerical score representing a degree or amount of privileged associated with a particular individual in the context of an organization's network systems. As discussed above, a privileged index can be based on one or more of: a degree of elevation of login credentials, a degree of access to specific data or system resources, access to intellectual property, ability to access employee or customer data, an ability to wire-transfer funds, access to insider information, etc.

Threat data 218 pertains to any information relating to cyber-security attacks on one or more users, systems or devices affiliated with private network 214. In some instances, threat data can include data regarding historic attacks perpetrated against other networks, such as those of entities or organizations that are affiliated with or similar to an enterprise associated with private network 214.

Threat data 218 is provided to threat detection module 206, which processes threat data 218 to identify cyber-security attacks against private network 214. Threat detection module 206 can identify actor/identity information, e.g., relating to an identity of the person, organization, nation state, and/or network address (IP address or domain name), etc., responsible for the cyber-attack. Additionally, threat detection module 206 can determine an attack type, and/or a degree of targetedness of the attack. Attack/threat types can be classified into categories including but not limited to: APT Malware State, APT Malware Financial, Backdoor, Sysadmin Tools, Pen-Test, RAT, Keylogger, Point-of-Sale, Stealer, Malware Unknown, Downloader, Credential Phish Unknown, Credential Phish Corporate, Ransom-ware, Credential Phish Consumer, Banker, Spambots, Cryptocurrency Miners, Ad-Fraud, MalSpam, and the like.

Threat detection module 206 can also perform processing necessary to determine attack targetedness. By way of example, threat detection module 206 can use threat data from one or more other private networks or industry groups (not illustrated), to make inferences regarding an attack specificity, i.e., the breadth (or narrowness) of an attack campaign within a specific context. Data resulting from processing performed by threat detection module 206 is provided to threat scoring module 208, which is configured to quantify cyber-security attacks and/or attack campaigns through association with a quantitative score or threat-index.

Actor identification and targetedness can be used to determine the threat-index generated by threat scoring module 208. Similar to results generated by vulnerability scoring module 202, and privilege scoring module 204, the output of threat scoring module 208 is provided to risk-index computation engine 210.

In some aspects, risk computation engine 210 is configured to generate a risk-index based on the vulnerability index, the privilege index, and the threat-index received from threat scoring module 208. The computed risk-index can be a quantitative value that provides a relative measure of risk. As discussed in further detail with respect to FIG. 4, the computed risk-index can be used to describe risk for a given network user, any group of users e.g., a business unit or division. In some methodologies, the computed risk-index can be associated with a particular geographic region, or group of regions. Alternatively, the risk-index may describe risk for one or more entity or business types, such as for an industry sector, etc. As such, risk-index scoring can be used to make comparisons of relative cyber-security risk across individual users in an organization, subdomains in a network, geographic locations, or across industry segments (e.g., healthcare, law, or retail), etc.

Figure 3:
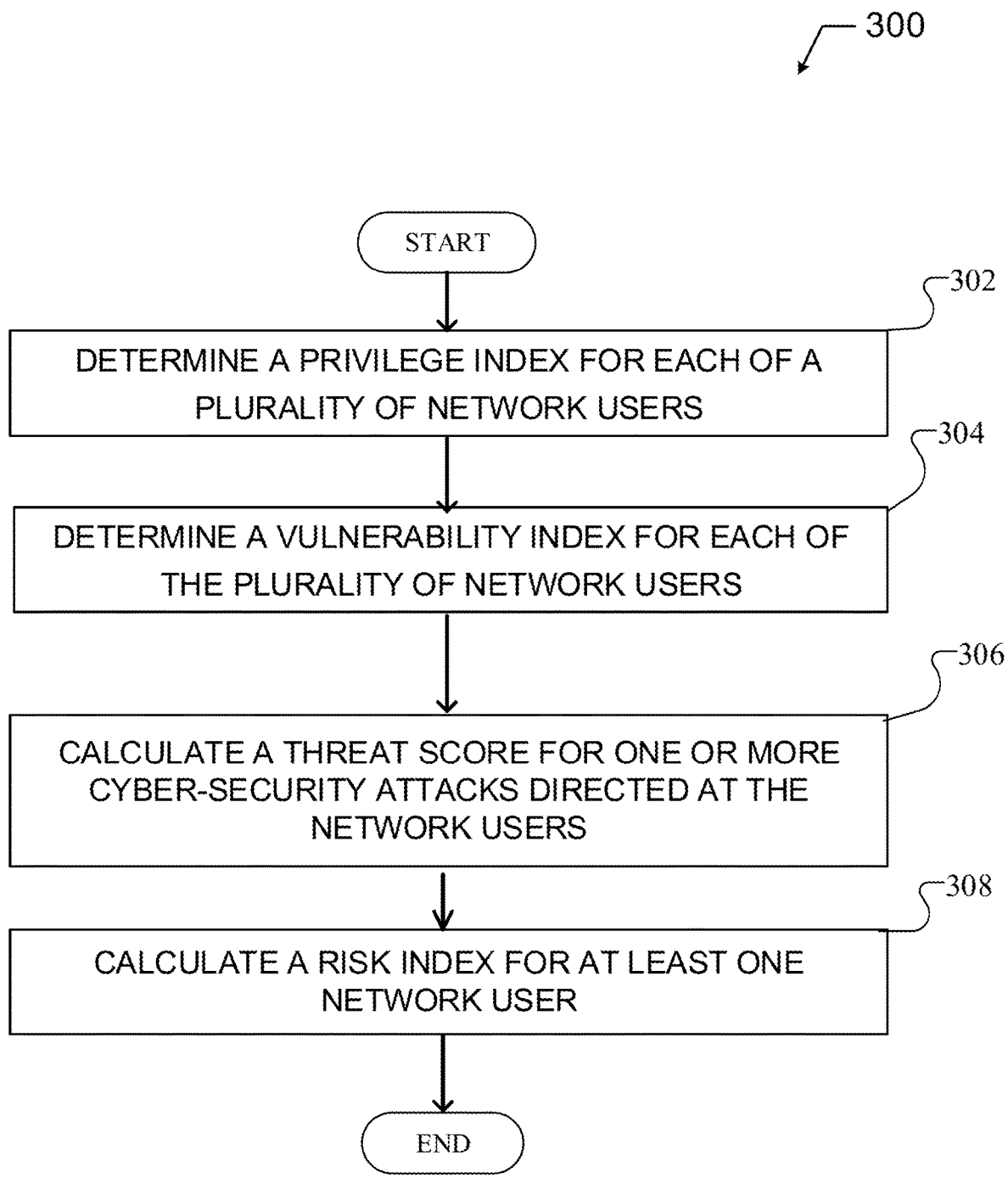
FIG. 3 illustrates an example process that can be used to perform risk-index scoring, according to some aspects of the technology.

FIG. 3 illustrates an example process 300 for performing risk-index computations. Process 300 begins when a privilege index is determined for each of a multitude of network users (302). As discussed above, the privilege index for a given user can be based on various factors relating to that user's network credentials, ability to access sensitive information, and/or ability transfer valuable resources. For example, the privileged index for a user having elevated network credentials can be greater as compared to a user with relatively restricted or limited network access. By way of further example, a user with administrative rights that possesses the ability to transfer funds, or access valuable information (e.g. intellectual property or sensitive other data) may have a greater privilege index as compared to another administrative user without such abilities.

In step 304, a vulnerability index is determined for each of the network users. The vulnerability index for each user provides a quantitative measure of the user's level of vulnerability to cyber-security threats. As discussed above, users exposed to a high frequency of threat vectors, or that have a history of being targeted may have a higher vulnerability index score. Vulnerability index scores can also be based on historic user behavior. For example, a user that has previously succumb to phishing attacks via email, or known to download unsecured attachments may be deemed a greater security risk, and therefore given a higher vulnerability score. Additionally, vulnerability index calculations can be affected by the type of software/systems used by a user. For example, updated and secured systems can cause a vulnerability index for the associated user to be lower (indicating less security risk) than the score for a user associated with unpatched systems for which potential exploits are known. By way of further example, user enrollment in safeguards such as two-factor authentication and/or biometric authentication can cause the vulnerability score to go down.

In step 306, a threat score is calculated for one or more cyber-security attacks directed at the network users. In some implementations, the threat score for each cyber-security attack is based on the targetedness for that attack. In some aspects, threat scores are further based on information regarding an identity of the attack perpetrator, and/or the type of attack. For example, attacks associated with groups or individuals know to be of high-sophistication may be deemed to be a greater threat, and given a greater corresponding threat score. As discussed above, targetedness can be used to describe the focused nature of an attack campaign or threat vector. That is, targetedness can refer to a measure of attack specificity, and can be based on the breadth (or narrowness) of a given attack or campaign within a defined context.

Measures of targetedness can take into account different metrics or data pertaining to a particular attack, attack campaign, industry and/or cyber-attack target. For example, targetedness can take into account a number of targets (customers), a number of messages sent to each target, a vertical (industry) associated with each target, and/or a geography of each customer. In some instances, for high-scoring threats that are deemed to target individuals, a higher targetedness may result from a relatively low number of messages being sent to a relatively small number of targets, e.g., three targets receiving five messages total. In this example, the calculated targetedness may be greater if those three targets all belong to the same industry, reside in a similar geographic location, or share another pertinent characteristic.

In some aspects, measures of high targetedness can be based on a relatively high number of attacks/messages that are sent to a specific target, or a relatively small number of targets, e.g., 250 messages/threats directed to one target/customer. In contrast, cyber-attacks directed at a large number of targets can be considered more widespread, and receive a correspondingly lower targetedness score. For example, a threat directed at 500 targets involving 2000 messages may receive a lower targetedness score.

In some approaches, more nefarious attacker identities (e.g., those of highly-sophisticated organized crime groups or nation states), can increase a threat score calculation, as opposed to attacks associated with less sophisticated attackers. Additionally, an attack can be highly targeted if it is directed at a specific group of highly similar individuals, such as all executive assistants in a particular industry sector. An attack can also have greater targetedness if directed at organizations or networks associated with a specific market vertical, e.g., specifically targeting insurance companies, law firms, or specific political organizations, etc. As such, the degree of targetedness assigned to an attack can depend on the scope and context in which the attack occurs.

In some instances, targetedness can also be based, in part, on an identity of the individual, organization, and/or nation state associated with the attack. For example, if a variety of different attacks are perpetrated closely in time and directed at individuals in different locations, but all traced back to a questionable actor/s from a specific embargoed country, then the attack may be deemed to be highly targeted.

Depending on the desired implementation, factors affecting targetedness can be manually defined by a user, such as a cyber-security domain expert. For example, a security professional may deem that attacker identity should be given greater weight than geographic origin when assessing targetedness. That is, different attack types emanating from different locations, that are associated with a common actor identity, may be deemed to be more targeted than similar attack types originating from a common location.

In step 308, a risk-index is calculated for at least one network user. The risk-index provides a quantitative indication of cyber-security risk that can be used to make comparisons between users. Because risk-index scoring can be performed for each user and therefore groups of users, risk-index scoring of individual network users can also be used to inform risk comparisons between organizations, market verticals, organizational segments (e.g., business divisions or regions), etc. As such, risk index scoring can be performed for an entire organization, industry, network, and/or network subdomain, etc. It is understood that risk-index calculations can be performed across virtually any user subset or market segment. Examples of ways in which risk-index scoring can be used to inform relative comparisons of cyber-security risk are discussed in further detail with respect to FIG. 4.

Figure 4:
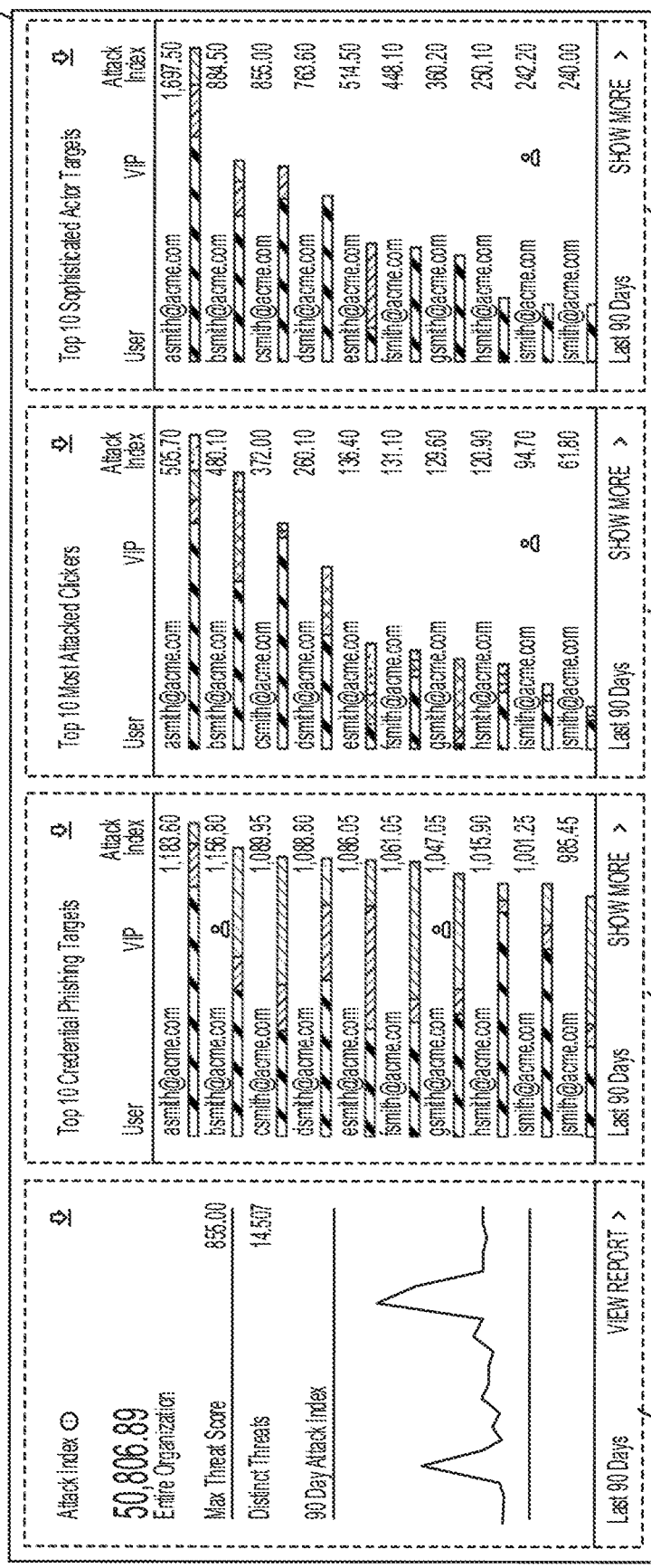
FIG. 4 illustrates an example graphical user interface (GUI) that can be used to communicate threat information, including risk-index information, according to some aspects of the technology.

FIG. 4 illustrates an example graphical user interface (GUI) 400 that can be used to communicate threat information, including risk-index (attack index) information, according to some aspects of the technology.

As illustrated in panel 402 of GUI 400, risk-index (attack index) data can be graphically displayed in a time series of risk-index values over a predetermined time period. In the provided example, attack index values are indicated over a 90 day period. However, any time period can be used, without departing from the scope of the invention.

In the illustrated example of panel 402, a composite attack index value is displayed for an entire organization (50, 806.89), with a maximum threat score value (855.00), and number of distinct threats detected (14,507), also indicated. In some instances, the overall attack index can be equal to the sum of risk-index scores calculated for each network user in an organization. In other aspects, such calculations may be weighted or normalized, for example, to accommodate quantitative comparisons between organizations of different size.

Panel 404 of GUI 400 illustrates a ranking of top network user targets by attack type (e.g., credential phishing), whereas panel 408 illustrates a ranking of users by attack index based on actor sophistication. It is understood that ranking visualizations can be provided, depending on the preferred embodiments. By providing attack/risk-index scoring on a user-by-user basis, different threat patterns can be surfaced and used to analyze and manage cyber-security risk at different levels of granularity, for example, ranging from a user basis to assessments made across entire industries or industry verticals.

Figure 5:
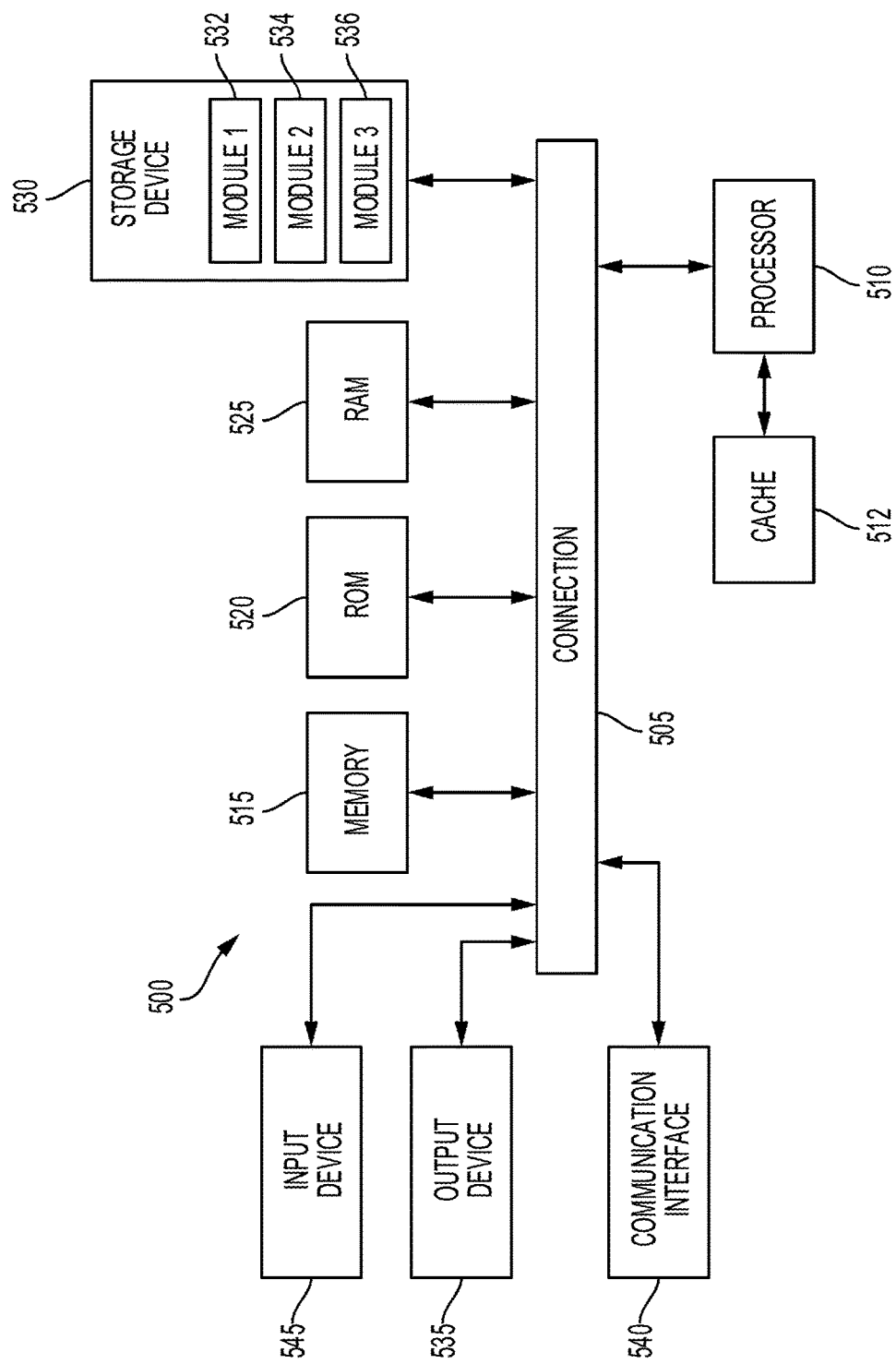
FIG. 5 illustrates an example of an electronic system with which some aspects of the subject technology can be implemented.

FIG. 5 illustrates an example of an electronic system 500 with which some aspects of the subject technology can be implemented. Persons of ordinary skill in the art will also readily appreciate that other system embodiments are possible. FIG. 5 illustrates a computing architecture 500 wherein the components of the system are in electrical communication with each other using a bus 505. System 500 includes a processing unit (CPU/s or processor/s) 510 and a system bus 505 that couples various system components including the system memory 515, such as read only memory (ROM) 520 and random access memory (RAM) 525, to the processor 510. System 500 can include a cache of high-speed memory connected directly with, or in close proximity to, or integrated as part of processor 510. System 500 can copy data from memory 515 and/or the storage device 530 to cache 512 for quick access by processor 510. In this way, the cache can provide a performance boost that avoids processor 510 delays while waiting for data. These and other modules can control or be configured to control processor 510 to perform various actions. Other system memories 515 can be available for use as well.

Memory 515 can include different memory types with different performance characteristics. Processor 510 can include any general purpose processor and a hardware module or software module, such as module 1 532, module 2 534, and module 3 536 stored in storage device 530, configured to control processor 510 as well as a special-purpose processor where software instructions are incorporated into the actual processor design. Processor 510 can be a completely self-contained computing system, containing multiple cores or processors, a bus, memory controller, cache, etc. A multi-core processor can be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. Communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-transitory memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can includes modules 532, 534, 536 for controlling the processor 910. Other hardware or software modules are contemplated. Storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

For clarity of explanation, the illustrative system embodiment is presented as including individual functional blocks including functional blocks labeled as a "processor" or processor 510. The functions these blocks represent may be provided through the use of either shared or dedicated hardware, including, but not limited to, hardware capable of executing software and hardware, such as a processor 510, that is purpose-built to operate as an equivalent to software executing on a general purpose processor. For example, the functions of one or more processors may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 510 can practice all or part of the recited methods, can be a part of the recited systems, and/or can operate according to instructions in the recited non-transitory computer-readable storage media. Such logical operations can be implemented as modules configured to control processor 510 can be configured to perform particular functions according to the programming of modules 532, 534, and/or 536.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method for assessing cyber-security risk:
   determining a privileged index for each of a plurality of network users;
   determining a vulnerability index for each of the plurality of network users;
   calculating a threat score for one or more cyber-security attacks directed at each of the plurality of network users, wherein calculating the threat score further comprises:
      determining a targetedness of the one or more cyber-security attacks,
   and wherein the threat score calculated for each of the one or more cyber-security attacks is based on the determined targetedness associated with the corresponding cyber-security attack of the one or more cyber-security attacks,
      identifying, based on a type of the one or more cyber-security attacks and an actor type corresponding to the one or more cyber-security attacks, a threat score range, wherein calculating the threat score comprises calculating:
      at least a first threat score based on a first targetedness of a first cyber-security attack of the one or more cyber-security attacks, wherein the first threat score indicates a lower bound of the threat score range, and
      at least a second threat score based on a second targetedness of a second cyber-security attack of the one or more cyber-security attacks, wherein
   the second threat score indicates an upper bound of the threat score range, and
   wherein the second targetedness is higher than the first targetedness;
      wherein the threat score range is within an overall score range;
      calculating a risk-index for at least one network user from among the plurality of network users, wherein the risk-index is based on the privileged index, the vulnerability index, and the threat score associated with each of the network users;
      ranking, based on the risk-index, the at least one network user along with the plurality of network users to create a list of a subset of the plurality of network users upon which to focus security resources; and
      displaying the ranked list.

2. The computer-implemented method of claim 1, wherein the threat score calculated for each of the one or more cyber-security attacks is based on a threat type associated with the cyber-security attack.

3. The computer-implemented method of claim 1, wherein the privileged index for each of the plurality of network users is based on a level of network access rights associated with the network user.

4. The computer-implemented method of claim 1, wherein the privileged index for each of the plurality of network users is based on one or more of: an ability to transfer funds, an ability to access employee data, or an ability to access intellectual property.

5. The computer-implemented method of claim 1, wherein the vulnerability index determined for each of the plurality of network users is based on the associated network user's performance on one or more security audits.

6. The computer-implemented method of claim 1, wherein the vulnerability index determined for each of the plurality of network users is based on: a frequency of interaction with threat vectors, or detected vulnerabilities in user software.

7. A system for assessing a cyber-security risk, the system comprising:
   one or more processors;
   a network interface coupled to the one or more processors; and a non-transitory computer-readable medium coupled to the one or more processors, wherein the medium comprises instructions stored therein, which when executed by the processors, cause the processors to perform operations comprising:
determining a privileged index for each of a plurality of network users;
determining a vulnerability index for each of the plurality of network users;
calculating a threat score for one or more cyber-security attacks directed at each of the plurality of network users, wherein calculating the threat score further comprises:
determining a targetedness of the one or more cyber-security attacks,
and wherein the threat score calculated for each of the one or more cyber-security attacks is based on the determined targetedness associated with the corresponding cyber-security attack of the one or more cyber-security attacks,
identifying, based on a type of the one or more cyber-security attacks and an actor type corresponding to the one or more cyber-security attacks, a threat score range, wherein calculating the threat score comprises calculating:
at least a first threat score based on a first targetedness of a first cyber-security attack of the one or more cyber-security attacks, wherein the first threat score indicates a lower bound of the threat score range, and
at least a second threat score based on a second targetedness of a second cyber-security attack of the one or more cyber-security attacks, wherein
the second threat score indicates an upper bound of the threat score range, and
wherein the second targetedness is higher than the first targetedness;
wherein the threat score range is within an overall score range;
calculating a risk-index for at least one network user from among the plurality of network users, wherein the risk-index is based on the privileged index, the vulnerability index, and the threat score associated with each of the network users;
ranking, based on the risk-index, the at least one network user along with the plurality of network users to create a list of a subset of the plurality of network users upon which to focus security resources; and
displaying the ranked list.

8. The system of claim 7, wherein the threat score calculated for each of the one or more cyber-security attacks is based on a threat type associated with the cyber-security attack.

9. The system of claim 7, wherein the privileged index for each of the plurality of network users is based on a level of network access rights associated with the network user.

10. The system of claim 7, wherein the privileged index for each of the plurality of network users is based on one or more of: an ability to transfer funds, an ability to access employee data, or an ability to access intellectual property.

11. The system of claim 7, wherein the vulnerability index determined for each of the plurality of network users is based on the associated network user's performance on one or more security audits.

12. The system of claim 7, wherein the vulnerability index determined for each of the plurality of network users is based on: a frequency of interaction with threat vectors, or detected vulnerabilities in user software.

13. A non-transitory computer-readable storage medium comprising instructions stored therein, which when executed by one or more processors, cause the processors to perform operations comprising:
determining a privileged index for each of a plurality of network users;
determining a vulnerability index for each of the plurality of network users;
calculating a threat score for one or more cyber-security attacks directed at each of the plurality of network users, wherein calculating the threat score further comprises:
determining a targetedness of the one or more cyber-security attacks,
and wherein the threat score calculated for each of the one or more cyber-security attacks is based on the determined targetedness associated with the corresponding cyber-security attack of the one or more cyber-security attacks,
identifying, based on a type of the one or more cyber-security attacks and an actor type corresponding to the one or more cyber-security attacks, a threat score range, wherein calculating the threat score comprises calculating:
at least a first threat score based on a first targetedness of a first cyber-security attack of the one or more cyber-security attacks, wherein the first threat score indicates a lower bound of the threat score range, and
at least a second threat score based on a second targetedness of a second cyber-security attack of the one or more cyber-security attacks, wherein
the second threat score indicates an upper bound of the threat score range, and
wherein the second targetedness is higher than the first targetedness;
wherein the threat score range is within an overall score range;
calculating a risk-index for at least one network user from among the plurality of network users, wherein the risk-index is based on the privileged index, the vulnerability index, and the threat score associated with each of the network users;
ranking, based on the risk-index, the at least one network user along with the plurality of network users to create a list of a subset of the plurality of network users upon which to focus security resources; and
displaying the ranked list.

14. The non-transitory computer-readable storage medium of claim 13, wherein the threat score calculated for each of the one or more cyber-security attacks is based on a threat type associated with the cyber-security attack.

15. The computer-implemented method of claim 1, wherein the targetedness is based on geographic specificity.

16. The computer-implemented method of claim 1, further comprising:
normalizing risk-indexes of the subset of the plurality of network users; and
performing, using the normalized risk-indexes, a quantitative risk comparison of a first organization, corresponding to the plurality of network users, to a second organization, wherein
the second organization is larger than the first organization.

17. The computer-implemented method of claim 1, wherein displaying the ranked list comprises graphically displaying a time series of risk-indexes of the ranked list over a predetermined time period.

18. The computer-implemented method of claim 1, wherein bounds of the overall score range are outside of the threat score range.

19. The computer-implemented method of claim 1, wherein the threat score range is specific to a combination of:
   the type of the one or more cyber-security attacks, and
   the actor type corresponding to the one or more cyber-security attacks, and wherein a second threat score range is specific to a combination of:
      a second type of cyber-security attack, and
      a second actor type.

\* \* \* \* \*